(12) United States Patent
Masera

(10) Patent No.: US 6,608,973 B2
(45) Date of Patent: Aug. 19, 2003

(54) PROCESS FOR MAKING AVAILABLE DIGITAL PHOTOGRAPHIC IMAGES

(75) Inventor: Eric Masera, Paris (FR)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/911,089

(22) Filed: Jul. 23, 2001

(65) Prior Publication Data

US 2002/0015594 A1 Feb. 7, 2002

(30) Foreign Application Priority Data

Jul. 31, 2000 (FR) .............................................. 0010031

(51) Int. Cl.[7] .............................................. G03B 17/48
(52) U.S. Cl. ........................ 396/429; 355/40; 358/527; 705/26
(58) Field of Search ................................ 396/311, 429; 358/506, 527, 408, 474, 487; 355/40, 18; 348/96, 97; 705/1, 26, 27

(56) References Cited

U.S. PATENT DOCUMENTS

| | | | |
|---|---|---|---|
| 5,666,215 A | | 9/1997 | Fredlund et al. |
| 5,760,916 A | * | 6/1998 | Dellert et al. ................ 348/211 |
| 5,760,917 A | * | 6/1998 | Sheridan ..................... 358/442 |
| 5,784,461 A | | 7/1998 | Shaffer et al. |
| 5,799,219 A | | 8/1998 | Moghadam et al. |
| 5,949,551 A | * | 9/1999 | Miller et al. ................ 348/211 |
| 6,017,157 A | * | 1/2000 | Garfinkle et al. ............. 355/40 |
| 6,069,712 A | * | 5/2000 | Dellert et al. ................ 358/408 |
| 6,243,171 B1 | * | 6/2001 | Haneda ...................... 358/1.15 |
| 6,324,521 B1 | * | 11/2001 | Shiota et al. .................. 705/1 |
| 2002/0067500 A1 | * | 6/2002 | Yokomizo et al. ......... 358/1.15 |

FOREIGN PATENT DOCUMENTS

| EP | 0 858 207 A | | 8/1998 |
|---|---|---|---|
| EP | 0 878 956 A1 | * | 11/1998 |

* cited by examiner

Primary Examiner—Alan A. Mathews

(57) ABSTRACT

A process is shown for making available digital photographic images. The process comprises: sending to a processing laboratory an exposed photosensitive film strip to be developed, digitizing each of the developed images without any printing of the images, destroying the film strip and providing several options to a customer for obtaining and/or viewing their digital images.

4 Claims, 2 Drawing Sheets

PROCESS FOR MAKING AVAILABLE DIGITAL PHOTOGRAPHIC IMAGES

FIELD OF THE INVENTION

The present invention relates to photography and more particularly to the production of digital photographic images, and a process for making the digital photographic images available.

BACKGROUND OF THE INVENTION

The current development of new technologies has enabled easier and faster remote communication. The existence of networks, such as for instance the web, which have been strongly developed recently, has enabled the transmission of files representing images to remote users.

The appearance of digital cameras has enabled digital files representing images to be obtained that can be transmitted by the networks. Nevertheless, the cost of a digital camera is relatively high and the general public would like to have less expensive means to obtain digital images.

The development of sites, for example, Internet-type sites, for commercial purposes enables, due to the presentation of images, the easier presentation to users of the products offered. Further, sites have been developed which include communities in which people, with common interests, share digital images that are easily accessible by the community.

Therefore systems are needed that enable the digital images to be obtained at a very low price.

SUMMARY OF THE INVENTION

An object of the invention is to provide digital images at a reasonable price.

The invention relates to a process, of making available to a user a photographic digital image from a film strip that includes at least one latent negative silver image which has been processed at a processing laboratory. The process comprises the following steps: a) in the processing laboratory, a1) the development, without printing, of the film strip so as to produce negative images from the latent images recorded on the film strip and scanning of the negative images recorded on the photographic film strip so as to produce a digital image file containing a digital representation of each negative image carried on the film strip, and in which each digital representation has at least one image having a first resolution; a2) the recording of the digital image file; a3) the access to the digital image file and the processing of the digital image file by a computer so as to obtain a display file, maybe having a second resolution inferior to the first resolution, enabling the viewing of one positive image for each of the negative images recorded on the photographic film strip; a listing index of the displayed image being linked to each of the positive images; a4) the transmission, to a previously defined customer address, of a message indicating the availability of the digital image file at a preset address; b) at the customer request, b1) either the transmission of the digital data chosen from among the following options: b1a) the display file having the second resolution, or b1b) one of the images having the second resolution to a set user address; or b2) the use of the data contained in the digital image file to make a paper printout of one of the recorded negative images.

The present invention therefore relates to a process of making available photographic digital images from a photographic film strip that includes at least one latent negative image. The process comprises the steps of: developing, without printing, a photographic film strip so as to produce negative images from latent images recorded on the photographic film strip; scanning the negative images recorded on the photographic film strip so as to produce a digital image file containing digital data representative of each negative image carried on the photographic film strip, wherein each digital representation has at least one image having a first resolution; recording the digital image file; accessing and processing the digital image file so as to obtain a display file having a second resolution, to enable a viewing of one positive image for each of the negative images recorded on the photographic film strip, wherein the displayed images are linked to each of the positive images; and transmitting, to a previously defined customer address, a message indicating an availability of the digital image file at a preset address; wherein, at a customer request, the process comprises at least one of: transmitting the digital data from the display file having the second resolution; transmitting at least one of the images having the second resolution to a set user address; or using data contained in the digital image file to make a paper printout of one of the recorded negative images.

The present invention further relates to a process of making available photographic digital images comprising the steps of: a) in a processing laboratory a1) developing, without printing, a photographic film strip having latent images recorded thereon so as to produce negative images from the latent images, and scanning the negative images so as to produce a digital image file containing digital data representative of each negative image carried on the photographic film strip, wherein each digital representation has at least one image having a first resolution; a2) recording the digital image file; a3) accessing the digital image file and processing the digital image file by a computer so as to obtain a display file having a second resolution to enable the viewing of one positive image for each of the negative images recorded on the photographic film strip, a listing index of the displayed image being linked to each of the positive images; a4) transmitting to a previously defined customer address, a message indicating the availability of the digital image file at a preset address; and b) at a customer request: b1) transmitting the digital data from among the following options: b1a) the display file having the second resolution, b1b) one of the images having the second resolution to a set user address; or b2) using digital data contained in the digital image file to make a paper printout of one of the recorded negative images.

BRIEF DESCRIPTION OF THE DRAWINGS

Other characteristics and advantages of the invention will appear on reading the description that follows with reference to the drawings.

DETAILED DESCRIPTION OF THE INVENTION

A person who wants to display a digital photographic image can currently proceed in several ways. For example, the person can buy a digital camera to produce shots and thus directly obtain a digital file, representing an image, which a computer can process later. The purchase of a digital camera is relatively expensive. The person can also produce in the usual way a silver type photograph with a photographic camera. The film strip, once exposed, is sent to a processing laboratory for development. Then photographic printing is carried out that can be digitized by the person with a digitizer. There are also laboratories that offer their services to simultaneously print the recorded images and supply digital files representing the images recorded on the photosensitive film strip.

An object of the invention is to reduce the cost to be billed to the user by removing certain operations and by only supplying the customer with one digital file representing each latent image recorded on the film strip.

Figure 1:
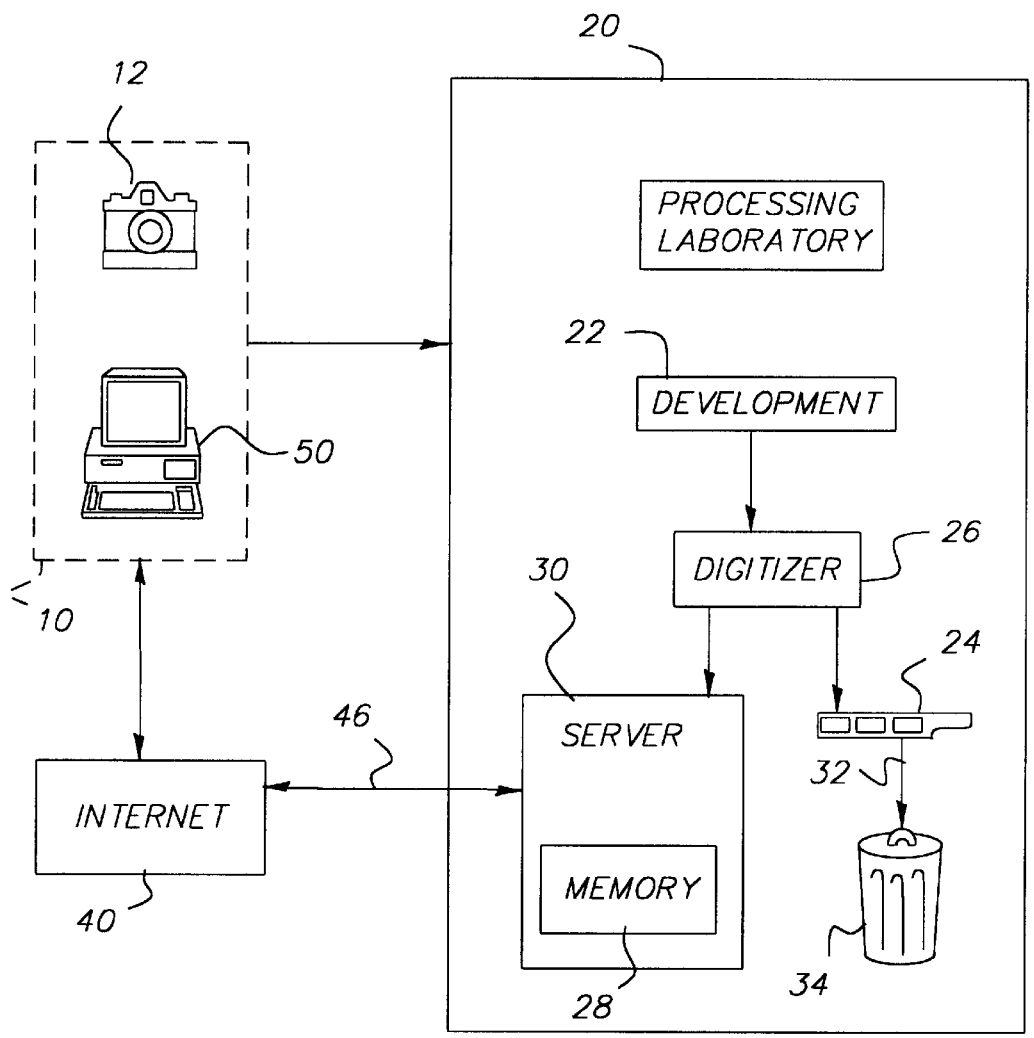
FIG. 1 represents diagrammatically the principal steps of the process of making available digital photographic images according to the invention.

As can be seen in FIG. 1, a user 10, diagrammatically represented by the rectangle with dotted lines, procures a conventional camera 12 loaded with an unexposed film strip (not shown). As will be seen, this type of camera is at a reasonable price compared with the price of a digital camera. After having taken the shots, the user sends the exposed film strip to a processing laboratory 20 for processing. The processing laboratory 20 develops 22 the exposed film strip 24. The revealed images are then analyzed by a digitizer 26 so as to obtain a digital file representing the recorded images. This file is then recorded in a memory 28 of a server 30. According to the invention, after digitization the laboratory eliminates (operation shown by the arrow 32) the film strip 24 which is not returned to the user (trash can 34).

Advantageously, this process, wherein the laboratory no longer needs to return the film strip to the user after processing, minimizes the production costs of the digital image file representing the images recorded on the film strip.

Indeed, the drying operation of the developed film strip can be minimized because it is not returned to the user and is destroyed practically immediately after use. Clearly the raw signal from the digitizer 26 must be processed so as to take into account not only the sensitivity and the composition of the film strip characteristics but also the diffusion of the light introduced by the thicknesses of the not completely dry layers. Further the processing can also be simplified because the problems of conservation of the film strip are no longer presented in the same way.

As can be seen in FIG. 1, the server 30 is linked to a network 40, e.g. an Internet-type network. Once the digital file is recorded on the server 30, the server automatically sends to a previously supplied address a message telling the user that his/her images are available and that they can interrogate the server to get these images. The user 10, using a computer 50 and a link represented by the arrow 46, can then connect to the network 40 and interrogate the server 30 to request the display of the images on their screen.

In one advantageous embodiment, the digitizer 26 provides a digital image file whose definition or resolution enables a photographic image to be obtained on paper that is acceptable for a given format, and the data supplied to the user for displaying the images has a second definition or resolution inferior to the first definition or resolution. Clearly in one advantageous embodiment the user can request from the server 30, the transmission of the display file of a particular image, or several images, to a set user address so as to enable the viewing of one or more images by one or more friends. In one advantageous embodiment there may also be transmission of the photographic image data to an image processor that offers quality photographic prints. Clearly this transmission may also be directed to printers giving adequate resolutions.

Figure 2:
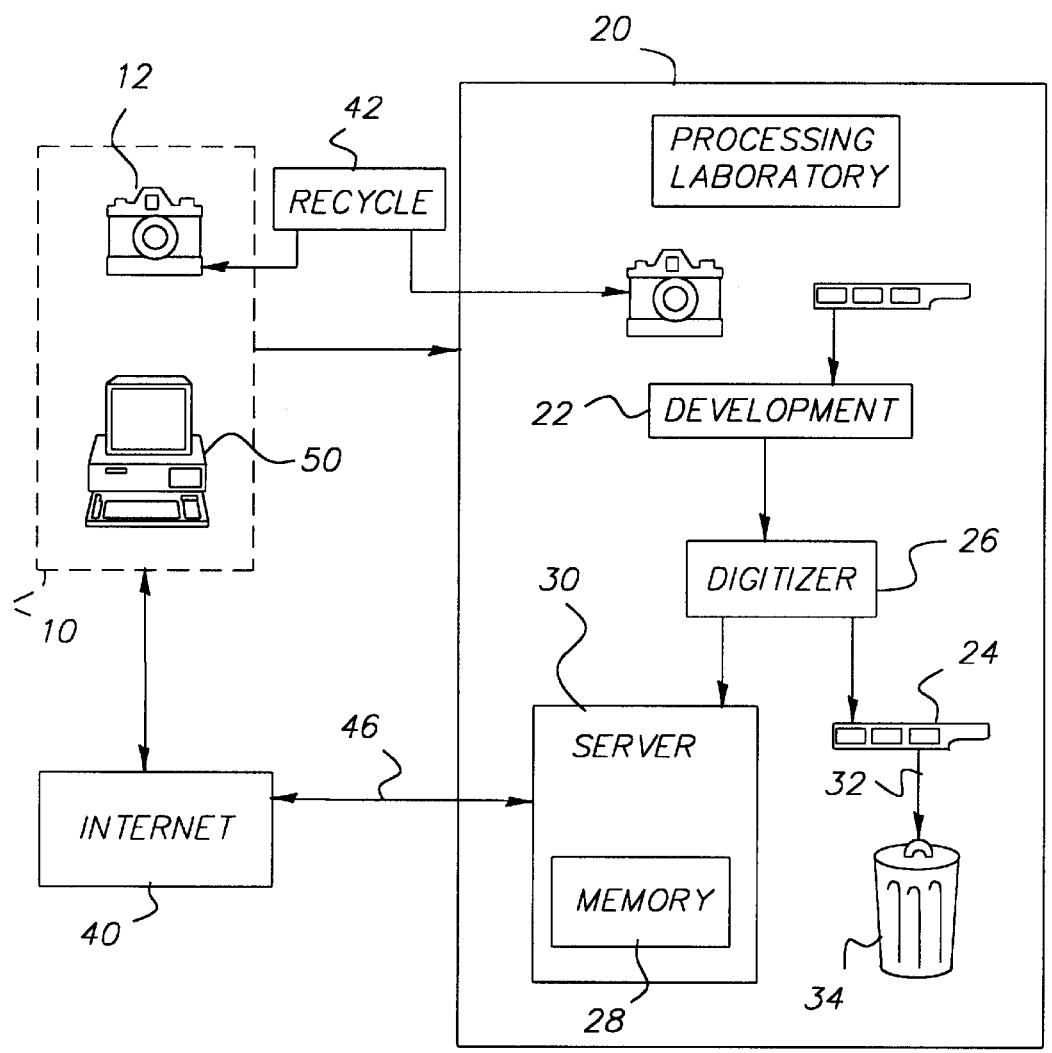
FIG. 2 represents diagrammatically another embodiment highlighting advantages due to the choice of specific elements in the use of the invention.

In one particularly advantageous embodiment shown in FIG. 2, the camera is a "one-shot" or single use camera where on its arrival in the processing laboratory the film strip is separated from the camera body. The film strip, as previously shown, is developed and then analyzed so as to give a user digital files representing each of the recorded images. The body of the "one-shot" or single use camera is returned to a specialist organization 42 which enables the useable parts of the camera to be recycled in order to manufacture a new "one-shot" or single use camera that can again be used as shown in the present application.

This type of processing has the advantage of providing digital images that can be displayed on a cellphone that can be linked for instance by an Internet network to the server containing the image, with the viewing of this image on the cellphone or on a kiosk or terminal and then the ordering of the print either by the kiosk or in a shop; payment being ensured by the telephone bill. This process further enables, for example, the ordering in advance of photographs in a shop that is conveniently located while limiting the wait for prints.

The invention has been described in detail with particular reference to certain preferred embodiments thereof, but it will be understood that variations and modifications can be effected within the spirit and scope of the invention.

What is claimed is:

1. A process of making available, on a server, photographic digital images from a photographic film strip that includes at least one latent negative image, the process comprising the steps of:

a) in a processing laboratory which comprises said server:

a1) developing, without printing, a photographic film strip having latent images recorded thereon so as to produce negative images from the latent images, and scanning the negative images so as to produce a digital image file containing digital data representative of each negative image carried on the photographic film strip, wherein each digital representation has at least one image having a first resolution;

a2) recording the digital image file on said server;

a3) destroying the photographic film strip;

a4) accessing the digital image file and processing the digital image file by a computer so as to obtain a display file having a second resolution to enable the viewing of one positive image for each of the negative images recorded on the photographic film strip, a listing index of the displayed image being linked to each of the positive images;

a5) transmitting, from said server, to a previously defined customer address, a message indicating the availability of the digital image file at the preset address; and wherein, b) at a customer request to said server, transmitting the digital data from among the following options:

b1) the display file having the second resolution to a set user address, or b2) one of the images having the second resolution to the set user address.

2. The process according to claim 1, wherein the second resolution is inferior to the first resolution.

3. The process according to claim 1, wherein the first resolution equals the second resolution.

4. The process according to claim 1, wherein at a customer request to the server, using digital data contained in the digital image file to make a paper printout of one of the recorded negative images.

* * * * *